United States Patent [19]

Hirabayashi

[11] 4,311,423
[45] Jan. 19, 1982

[54] HOLE-DRILLING, EXTRUDING AND THREAD-FORMING SHEET SCREW

[76] Inventor: Fumio Hirabayashi, 11-11, 3-chome, Nishimikuni, Yodogawa-ku, Osaka, Japan

[21] Appl. No.: 40,538

[22] Filed: May 21, 1979

[30] Foreign Application Priority Data

Apr. 25, 1975 [JP] Japan .............................. 50-57430[U]
Apr. 25, 1975 [JP] Japan .............................. 50-57431[U]

[51] Int. Cl.³ ............................................. F16B 25/00
[52] U.S. Cl. ................................................... 411/387
[58] Field of Search ............... 85/41, 44, 47, 30, 22, 85/20, 1 P; 408/226, 227; 10/152 R, 152 T; 411/387, 386, 378

[56] References Cited

U.S. PATENT DOCUMENTS

| | | | |
|---|---|---|---|
| 88,539 | 4/1869 | Bocking | 85/47 |
| 551,354 | 12/1895 | Lee | 85/44 |
| 1,485,202 | 2/1924 | Rosenberg | 85/44 |
| 2,703,419 | 3/1955 | Barth | 85/47 X |
| 3,093,028 | 6/1963 | Mathie | 85/41 |
| 3,357,295 | 12/1967 | Smith | 85/41 |
| 3,438,299 | 4/1969 | Gutshall | 85/41 |
| 3,682,038 | 8/1972 | Lejdegärd | 85/41 |
| 3,724,315 | 4/1973 | Sygnator | 85/47 |
| 4,068,554 | 1/1978 | Hirabayashi | 85/41 |

FOREIGN PATENT DOCUMENTS

| | | | |
|---|---|---|---|
| 247297 | 9/1963 | Australia | 85/41 |
| 412637 | 5/1910 | France | 85/44 |
| 1008781 | 2/1952 | France | 85/41 |

*Primary Examiner*—Ramon S. Britts
*Attorney, Agent, or Firm*—Birch, Stewart, Kolasch & Birch

[57] ABSTRACT

A hole-drilling, extruding and thread-forming sheet screw comprises an inverted pyramidal hole-drilling section with cutting edges, an inverted, truncated-pyramidal extruding section integral with the hole-drilling section, and a cylindrical thread-forming section with male threads integral with the extruding section. The extruding section includes four substantially vertically extending flat side surfaces and four substantially vertically extending ridges, each of which provides a smooth, curved surface gradually and progressively increasing in its radius and arcuate length as it extends upwardly, so that the curved surface can serve as an active surface for smoothly enlarging a hole drilled in a workpiece and forcibly deforming metal around the hole to form a desired tubular extrusion with the workpiece.

8 Claims, 20 Drawing Figures

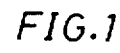
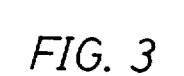
FIG. 3  FIG. 2  FIG. 1
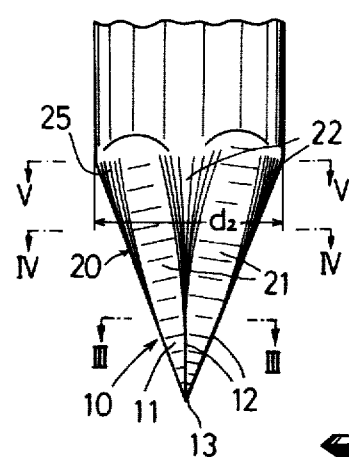
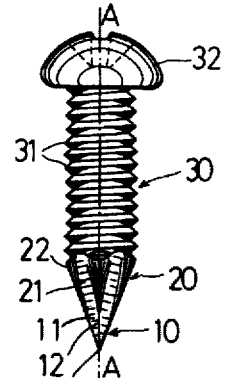
FIG. 4
FIG. 5
FIG. 7
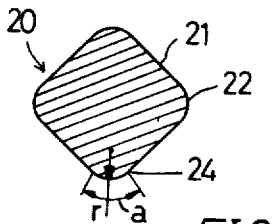
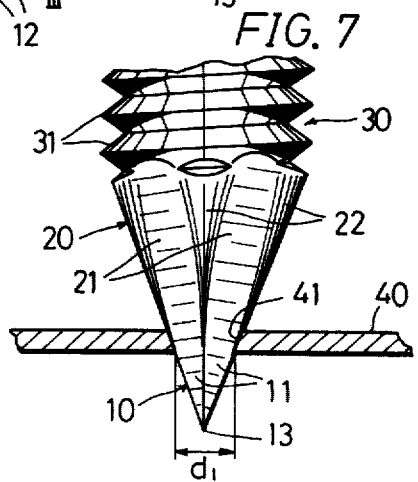
FIG. 6
FIG. 8
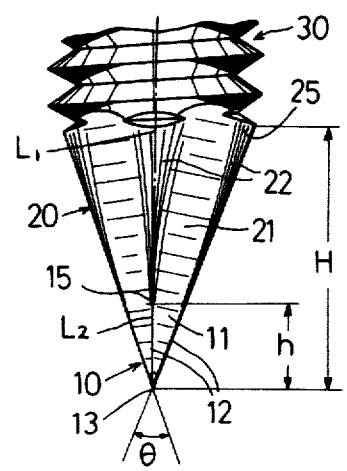
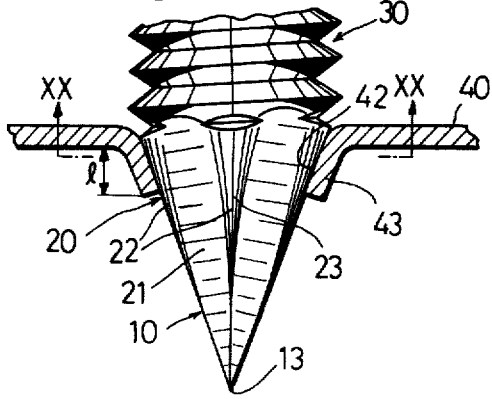

HOLE-DRILLING, EXTRUDING AND THREAD-FORMING SHEET SCREW

BACKGROUND AND SUMMARY OF INVENTION

The present invention is a continuation-in-part of my copending application Ser. No. 597,285, filed July 18, 1975, now abandoned.

The present invention relates to a hole-drilling, extruding and thread-forming sheet screw for use with a workpiece in the form of a metallic sheet or relatively thin metal plate, and more particularly to improvements in a sheet screw which is so designed as to initially form a small pilot hole in the workpiece by self-drilling, then form a tubular projection or extrusion by forcibly enlarging the drilled hole and deforming the metal around said hole, and finally form female threads internally with the formed extrusion by self-threading.

Generally, the hole-drilling, extruding and thread-forming sheet screws should be firmly fastened into or gripped by the workpiece. For that purpose, the following four requirements should be met, the first being that the axial length or height of a formed tubular projection or extrusion should be as large as possible, so that the formed extrusion can be internally formed with a maximum number of female threads; the second being that the wall thickness of the formed extrusion should not be so reduced as to lose its rigidity; the third being that undesirable cracks or splits in or around the formed extrusion should be prevented from development during axial feeding and rotation of the sheet screw; and the fourth being that the internal diameter of the formed extrusion should not be excessively enlarged by vibration during rotation of the sheet screw. Further, as the fifth requirement, from the viewpoint of a product appearance, the sheet screw should be designed so that it can be efficiently driven into the workpiece without such a great axial force as to cause an undesirable concave deformation in the workpiece.

However, none of the conventional hole-drilling, extruding and thread-forming sheet screws are provided with all of the above-discussed five requirements. For example, a hole-drilling and thread-forming screw as disclosed in Australian Pat. No. 247,297 to Kahn, which is considered to be one of the most relevant prior art patents in the field, does not meet the first thru the third requirements. The screw according to Kahn comprises a substantially bulletnosed pilot end section which includes a front drilling section with cutting edges and a conical extruding section with male threads, and a cylindrical body section with male threads. Because the male threads disposed on the conical extruding section will cut the internal wall of a drilled hole in the workpiece after the drilling operation by the drilling section has been finished, the wall thickness of the formed extrusion is excessively reduced, and undesirable cracks or splits are easily developed.

Another example of the conventional hole-drilling, extruding and thread-forming screw is disclosed in U.S. Pat. No. 3,438,299 to Gutshall, which is also considered to be one of the most relevant prior art patents. The screw according to Gutshall comprises a drilling section including a tip portion and a substantially flat portion, an extruding section with a spiral flute having sharp edges for easy penetration into the workpiece, and a cylindrical thread-forming section with male threads, said extruding section being defined by one-half of a bulletnosed configuration generally triangular in cross section and thus non-symmetrical. When this type of screw is driven into the workpiece at a relatively high rotative speed (usually about 2,000 to 2,500 by an electric screw driver, and about 4,000 to 5,000 by a pneumatic screw driver), it has proven that considerably large vibrations are generated due to the non-symmeticical construction of the extruding section. This results in producing an initially formed hole to be excessively enlarged in diameter, and promotes development of cracks or splits caused by the sharp edges of the spiral flute. In other words, the screw of Gutshall does not meet the afore-mentioned third and fourth requirements. Further, the peculiar and specific construction of the Gutshall screw invites a high manufacturing cost, as will be easily understood.

A further example of the conventional hole-drilling, extruding and thread-forming screw is disclosed in U.S. Pat. No. 3,724,315 to Sygnator, which is also considered to be one of the most relevant prior art patents in the field. The screw according to Sygnator comprises a front drilling section with sharp cutting edges, a conical extruding section which is generally elliptical in cross section, and a cylindrical thread-forming section with male threads, wherein the central axis of said conical extruding section is out of alignment with or in other words not coincident with the axis common to the drilling section and the thread-forming section, and said sharp cutting edges extend into the conical extruding section. Thus, the non-symmetrical (elliptical) construction and the eccentrically disposed central axis of the conical extruding section cause considerable vibrations when the screw is driven into the workpiece at a relatively high rotative speed thereby to cause the hole in the workpiece to be excessively enlarged in diameter. Further, because the sharp cutting edges extend from the front drilling section up into the conical extruding section, not only a relatively large hole is formed by drilling thereby to reduce the axial length or height of the formed extrusion, but also the particular construction permits chips produced by drilling to remain on the conical extruding section. Those chips cannot be removed easily, because the gaps between the internal circular surface of the drilled hole and the external circular surface of the conical extruding section are so small since the latter section is substantially circular in cross section. As a result, the internal wall of the formed extrusion is injured and cut by the produced chips during a high speed rotation of the screw thereby to cause reduction in the wall thickness of the extrusion as well as development of cracks or splits in and/or around the extrusion. Further, it should be noted that a bottom portion of the conical section, which initially comes into contact with the marginal edge of the drilled hole, is considerably large in radius and area, and this naturally causes insufficiency in a desired stress concentration required for effectively enlarging the drilled hole. Thus, deforming the metal around the hole cannot be obtained because of stress dispersion, resulting in that a sufficiently high or long extrusion cannot be formed. Further, the insufficiency in the stress concentration, in other words stress dispersion, invites such a disadvantage that a great axial force is required for feeding the screw axially into the workpiece, which, in turn, causes not only an undesirable concave deformation in the workpiece but also insufficiency and fatigue in operation since an operator must apply a great physical force.

Thus, it is comprehensible that the Sygnator's screw is dissatisfactory in all of the aforementioned first thru fifth requirements.

Though not relating to a hole-drilling, extruding and thread-forming sheet screw, U.S. Pat. No. 2,703,419 to Barth is considered to be one of the relevant prior art patents in the field, wherein a combination tool is disclosed which is designed so as to cooperate with a die having an orifice therein for forming a tubular extrusion and then forming internal threads in the formed extrusion. This tool comprises a piercing (drilling) front section, an extruding section with spherical, conical surface, and a thread-forming section with male threads, wherein the extruding section is radially enlarged quite abruptly and thus the configuration line defining the drilling and the extruding sections is not rectilineal. In other words, the drilling section is not transformed into the extruding section quite smoothly, but provides a substantial step therebetween. Thus, when the bottom area of the extruding section comes into the marginal wall of a hole formed by the drilling section, there occurs a considerably great resistance against the axial penetration of the extruding section into the workpiece. Thus, in order to overcome this resistance, a correspondingly great axial force must be applied for the penetration of the extruding section into the workpiece, thereby causing an undesirable concave deformation in the workpiece as well as poor efficiency and an operator's fatigue in operation. This problem can be ignored in tool set forth in the Barth Patent, because it is a combination tool cooperating with the die. However, if the idea of this combination tool is applied to a sheet screw, the problem is quite significant, particularly in the case where workpiece is a relatively thin or is a soft metallic sheet which can be easily deformed concavely. Further, as substantially same with the above-discussed screw of Sygnator, the Barth's tool, if utilized as a sheet screw, has such a disadvantage that the bottom portion of the extruding section, which comes into contact with the marginal wall of a drilled hole, is so large in radius and contacting area that the stress required for forcibly enlarging the drilled hole and then forming a desired extrusion is inevitably dispersed, thereby hindering effective penetration of the extruding section into the workpiece. Namely, if the Barth's tool is applied to the hole-drilling, extruding and thread-forming sheet screw, it does not meet the afore-mentioned fifth requirement.

It is, therefore, a primary object of the present invention to provide an improved hole-drilling, extruding and thread-forming sheet screw designed so as to meet all of the above-discussed five requirements.

The above and other objects, features and advantages of the present invention will become more apparent from the following description of some of the preferred embodiments thereof taken in conjunction with the accompanying drawings. It is to be expressly understood, however, that the drawings are for purpose of illustration only and are not intended as defining the limits of the present invention.

BRIEF DESCRIPTION OF THE DRAWINGS

FIG. 1 is a front elevation of the first embodiment of a sheet screw according to the present invention;

FIG. 2 is a greatly enlarged fragmentary elevation showing in detail the front end portion of a blank of the screw of FIG. 1;

FIGS. 3 to 5 are horizontal cross sections taken along the lines III—III, IV—IV and V—V of FIG. 2, respectively;

FIG. 6 is an enlarged fragmentary elevation of the sheet screw of FIG. 1, illustrating in detail the screw end and a lower part of a threaded shank;

FIG. 7 is an enlarged fragmentary elevation of the sheet screw of FIG. 1, illustrating the hole-drilling section thereof piercing a workpiece to form an initial hole therein;

FIG. 8 is a similar view to FIG. 7 illustrating a tubular extrusion being formed around the drilled hole in the workpiece;

DESCRIPTION OF THE PREFERRED EMBODIMENTS

Figure 9:
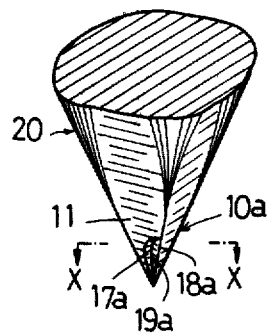
FIG. 9 is a fragmentary perspective view of the second embodiment of the sheet screw according to the present invention, wherein the hole-drilling section is modified.

Referring now to the drawings, in particular to FIGS. 1 to 8 illustrating the first embodiment of the invention, a hole-drilling, extruding and thread-forming sheet screw comprises a front hole-drilling section 10, an extruding section 20 connected at its lower end to and integral with the hole-drilling section 10, and a thread-forming section 30 connected at its lower end to and integral with the extruding section 20. The hole-drilling section 10 is of an inverted regular pyramid in shape and square in cross section with four sides 11 and four sharp corners 12 as shown in FIG. 3. Thus, the hole-drilling section 10 has four substantially vertically extending triangular flat side surfaces 11 defined by said sides 11 and four substantially vertically extending rectilineal cutting edges 12 defined by said sharp corners 12. The hole-drilling section 10 has a piercing point 13 at its bottom end, from which said four rectilineal cutting edges 12 extend divergently upwardly, but should not extend into the extruding section 20. The four rectilineal cutting edges 12, which serve as drilling edges for forming an initial pilot hole 41 in a workpiece 40 to be hereinafter described in detail, are spaced apart from each other at an equal angular interval and extend divergently from said point 13 at an equal divergent angle with respect to a central vertical axis A-A of the sheet screw passing said point 13.

The extruding section 20 is of an inverted, truncated regular pyramid in shape and square in cross section with four sides 21 and four round corners 22 which are smoothly continuous to one another, so that no step is formed at a position 24 where the side 21 adjoins the round corner 22. Thus, the extruding section 20 has four substantially vertically extending flat side surfaces 21 defined by said sides 21 and four substantially vertically extending rounded ridges 22 defined by said round corners 22. Each of the rounded ridges 22 provides substantially vertically extending smooth, curved surfaces 23 gradually and progressively increasing in its radius (r) and arcuate length (a) as the rounded ridges 22 extend upwardly, so that the curved surface can serve as an active surface for smoothly enlarging the hole 41 drilled in the workpiece 40 and forcibly deforming metal around the drilled hole to form a desired tubular extrusion 43 with the workpiece initially with an active force concentrated at a lower end 15 of each of the rounded ridges 22 and then with said active force gradually dispersed as the extruding section 20 penetrates into the workpiece 40.

The radius (r) of each rounded ridge 22 may preferably be minimized substantially to zero at the lower end 15 of the extruding section 20 where each rounded ridge 22 is smoothly continuous with each of the rectilineal cutting edges 12 of the drilling section 10, in such a manner that a central ridge line ($L_1$) of each rounded ridge 22 and an edge line ($L_2$) of each cutting edge 12 are disposed on a common rectilineal line as shown in FIG. 6.

Figure 20:
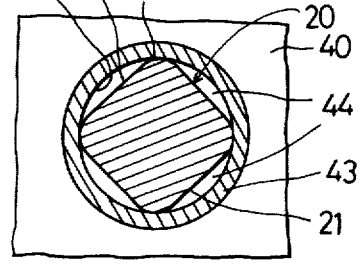
FIG. 20 is a slightly reduced horizontal cross section taken along the line XX—XX of FIG. 8, showing operation of forming the tubular extrusion.

Each of the four flat side surfaces 21 of the extruding section 20 is smoothly continuous with each of the four triangular side surface 11 of the hole-drilling section 10 in such a manner that both of the side surfaces 11, 21 are disposed on the same substantially vertically extending plane, so that chips produced by the hole-drilling section 10 can be moved into and received within four spaces or gaps 44 (FIG. 20) defined by the four flat side surfaces 21 and the internal wall of the enlarged drilled hole 42. The four flat side surfaces 21 still exist even though the arcuate length (a) of each rounded ridge 22 is maximized at the top end 25 of the extruding section 20, so that the four spaces or gaps 44 can remain existing at said top end 25.

The extruding section 20 is formed with neither any drilling or cutting edge nor any thread or other projection, and thus is symmetrical in every direction with respect to the central vertical axis A—A of the sheet screw.

An included angle defined by a pair of rectilineal cutting edges 12 as indicated by its vertically opposite angle $\theta$ in FIG. 6 may vary preferably within the range of 25° to 45° in accordance with hardness of a workpiece material to which the screw is to be applied. Generally, in the case of the workpiece is made of iron or the like hard metal, the angle $\theta$ should be increased to about 45°. While, if the workpiece is made of aluminum or the like softer metal, the value of $\theta$ should be decreased to about 25°.

The hole-drilling section 10 is of a length or height as defined by the reference line (h) in FIG. 6, while a length or height of the extruding section 20 is defined by (H-h) in the same figure. Generally, the value of (h) should be within the range of from about one-fourth to one half of the value of (H) defined by a distance from said piercing point 13 to the top end of the extruding section 20. Experiments have proved that, the length (l) of a formed extrusion 43 (FIG. 8) becomes decreased as the value of (h) becomes larger than one half of the value of (H). On the other hand, if the value of (h) becomes smaller than one-fourth of the value of (H), the length (l) of the formed extrusion becomes larger but undesirable cracks or splits are produced. Generally, the most suitable values of (h) and (H) should be determined principally in dependence on the thickness of the workpiece.

The thread-forming section 30 has a cylindrical body and male threads 31 formed therewith. The cylindrical body is equal in external diameter in every point thereof. The male threads 31 are arranged so as to cut female threads internally with the formed extrusion 43, as is conventional. A screw head 32 is connected to the top end of the cylindrical body, as is conventional.

In operation, when the screw is driven by means of a known power screw driver, the point 13 first pierces the workpiece 40 at a desired location to form a pin hole therein. The pin hole is then enlarged by the drilling function of the cutting edges 12 of the section 10 to form an enlarged drilled hole 41 as shown in FIG. 7. As soon as the hole 41 is enlarged to give a diameter ($d_1$) which substantially corresponds to the maximum external diameter of the hole-drilling section 10, the extruding section 20 enters the drilled hole 41 to expand it forcibly to form the more enlarged hole 42 and simultaneously therewith to start to form a tubular extrusion 43 which extends out from the reverse side of the workpiece 40, as shown in FIG. 8. Next, the thread-forming section 30 is driven through the hole 42 into the formed extrusion 43 to form mating internal threads therewith by the self-threading function of the male threads 32 rolled on the cylindrical body.

In the above operation, since the hole-drilling and the extruding sections 10, 20 are symmetrical in every direction with respect to the central vertical axis A—A of the screw, undesirable vibrations can be minimized. As a result, not only is it easy to locate the piercing point 13 exactly at a position where the screw should be fastened, but also it is possible to prevent the internal diameter of the drilled hole 41 to become excessively larger than the diameter ($d_1$) defined by the maximum diameter of the hole-drilling section 10 and also to prevent the internal diameter of the formed extrusion 43 to become excessively larger than the maximum diameter ($d_2$) (FIG. 2) of the extruding section 20. Thus, the tubular extrusion 43 with a sufficient length (l) can be obtained and also the male threads 31 of the thread-forming section 30 can be tightly engaged with the internal female threads formed within the extrusion 43.

Since each of the rounded ridges 22 of the extruding section 20 is constructed so that its radius (r) becomes gradually decreased as each of the rounded ridges 22 approaches the hole-drilling section 10, to finally present a substantially zero discontinuity at the continuation point 15 where the rounded ridge 22 is smoothly continuous with one of the rectilineal cutting edges 12, the drilled hole 41 is initially enlarged and deformed for shaping an extrusion 43 by the active surface 23 with the minimum radius (r) and the minimum arcuate length (a). This means that the active force required for forming the extrusion 43 is effectively concentrated initially to a very small area on the lower part of the active surface 23 of each rounded ridge 22, so that the screw of this invention can be driven into the workpiece 40 with a relatively small axially propelling force, without producing an undesirable concave deformation in the workpiece 40. While, since the active force then becomes gradually dispersed as the radius (r) of the active surface 23 is gradually increased during penetration into the drilled hole 42, undesirable cracks or splits in and/or around the formed extrusion 43 can be prevented from or at least minimized in occurrence.

Because each flat side surface 11 of the hole-drilling section 10 and each flat side surface 21 of the extruding section 20 are smoothly continuous with each other, the chips produced by the drilling function of the section 10 are permitted to escape into and be retained within the spaces or gaps 44 formed between the internal surface of the formed extrusion 43 and said flat side surface 21 of the section 20. Further, since each of said gaps 44 remain existing at the top end 16 of the extruding section 20, the chips can be retained within the gaps 44 until the extruding function is finished. Thus, it is possible to minimize the disadvantage that the internal wall of the formed extrusion 43 are injured or scratched-off by the produced chips caught and jammed between the curved surface 23 of each of the rounded ridges 22 and the internal wall surface of the extrusion 43, resulting in that not only will the undesirable cracks or splits in and/or around the extrusion 43 be prevented from occurrence but also the wall thickness of the extrusion 43 can be prevented from being decreased to lose its rigidity.

According to the experiments carried out by me, wherein a Gutshall model screw was employed with a 4 mm external diameter of the threaded shank available in the market under "EX"-brand produced by Illinois Tool Works, Inc., of Chicago; a Kahn model screw was employed with a 4 mm external diameter of the threaded shank prepared by myself by machining and rolling in accordance with the drawings disclosed in Australian Pat. No. 247,297; a Barth model screw was employed with a 4 mm external diameter of the threaded shank prepared by myself by machining and rolling in accordance with the drawings disclosed in U.S. Pat. No. 2,703,419, and a model of my screw was employed with a 4 mm external diameter of the threaded shank prepared by myself by forging and rolling, the following results were obtained after five demonstration per each screw:

(1) After having driven each model of the screws into a pilot hole previously drilled in a workpiece in the form of a steel plate with 0.6 mm in thickness, I measured such a force as required for removing or pulling the driven screws out of the workpiece into which the model screws were fastened. The result was that said force with respect to the model screw of the present invention was greater than that of the employed Gutshall model by about 1.3 times, greater than that of the employed Kahn model by about 1.25 times, and greater than that of the employed Barth model by about 3.7 times, on the average of five demonstrations.

(2) After continuing to impart a screwing torque to each model screw which had been fully driven into the workpiece until its screw head was in tight contact with the workpiece, I measured the stripping torque, that is, the force required for breaking the female threads formed internally with the formed extrusion until at last the fully driven screw becomes substantially freely rotatable within the formed extrusion. The result was that the stripping torque required for the model screw of the present invention was greater than that of the employed Gutshall model by about 1.5 times, greater than that of the employed Kahn model by about 1.6 times, and greater than that of the employed Barth model by about 3.3 times, on the average of five demonstrations.

(3) After each model screw had been fully driven into the workpiece, I measured the height or axial length of the formed extrusion. The result was that said height or length by the employed model screw of the present invention was larger than that by the employed Gutshall model by about 1.8 times, larger than that by the employed Kahn model by about 1.5 times, and larger than that by the employed Barth model by about 1.1 times, on the average of five demonstrations.

(4) When driving each model screw into the workpiece, I measured the propelling force, that is, the force required for axially feeding the screw into the workpiece. The result was that the propelling force of the model screw of the present invention was substantially the same as that of the employed Gutshall model, and larger than that of the employed Barth model by about 2.5 times. While, the propelling force of the employed Kahn model was about four-fifths of that of the employed model of my invention. This means that the Kahn screw can be driven into the workpiece with the smaller axial force than the screw of the present invention. This is believed to have resulted from the male threads formed with the extruding section of the Kahn model. While, the greatest propelling force required in the Barth model is believed to have resulted from the abruptly increasing radius in its extruding section.

(5) After each model screw had been fully driven into the workpiece, I measured the produced chips. The result was that the amount of the chips produced by the model screw of the present invention was about 95% of that by the employed Gutshall model, about 62.5% of that by the employed Kahn model, and about the same as that by the employed Barth model, on the average of five demonstrations. The large chip amount produced by the Kahn model is believed to have resulted from the cutting function of the male threads formed with its extruding section.

In the above experiments, the employed Guthshall model generated remarkable vibrations larger than any other models, and therefore, its difference between the maximum measured values and the minimum measured values in said pulling-out force and said stripping torque was greater than those of any other models. Said difference between the measured values in the pulling-out force and the stripping torque of the model of my invention was substantially the same as that of the Kahn model and that of the Barth model.

In the above experiments, a Sygnator model was not employed because I failed to prepare an exact model thereof. It was so difficult to prepare the exact model of Sygnator screw by machining process since the extruding section thereof is elliptical in cross section, although it probably could be prepared by forging process by using a pair of accurate forging dies which are very expensive to prepare. Further, it should be noted that the above experiments were carried out only by five demonstrations with five specimens per each model under not so very strict conditions. However, I believe the results obtained provide certain informations on the specific properties of each of the employed models.

Now, FIGS. 9 to 18 illustrate second to sixth embodiments distinguished by provision of means for removal of chips which are cut from the body of the workpiece 40 during the hole-drilling operation by the cutting edge 11 of the hole-drilling section. It will be understood that the removal of chips is very important since they frequently damage the internal surfaces of the formed extrusion 43 to cause easy development of cracks or splits therewith. It will be also understood that the drilled hole 41 should be finished as smooth as possible in order to make it easy to form the extrusion 43 with the desired height without cracks or splits for attainment of tight screwing-in. Further, the presence of the chips wastes efforts on driving the screw.

Figure 10:
FIG. 10 is a horizontal cross section taken along the line X—X of FIG. 9.

Thus, the modified sheet screw as shown in FIGS. 9 and 10 is provided with a pair of recesses 17a at opposite sides of the hole-drilling section 10a in the manner that each recess 17a expands upwardly from the point 13 along one of the cutting edges 11 so as to give an acute-angled cutting edge 18a and a flat vertical rake face 19a extending diagonally towards the central vertical axis of the screw as shown in FIGS. 9 and 10. In operation, the chips which are cut off by said cutting edges 25a can be raked or scooped by the recesses 17a for removal.

Figure 11:
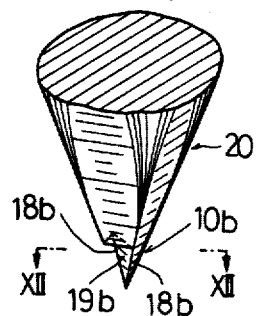
FIG. 11 is a similar view to FIG. 9, showing the third embodiment of the present invention.
Figure 12:
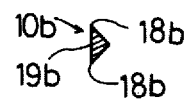
FIG. 12 is a cross section taken along the line XII—XII of FIG. 11.

In a further modified screw as shown in FIGS. 11 and 12, a half of the hole-drilling section 10b is cut off diagonally so as to give a vertical rake face 19b and a pair of acute-angled cutting edges 18b. In operation, the chips are produced mainly by said cutting edges 18b and then can be easily removed through the space adjacent said rake face 19b.

Figure 13:
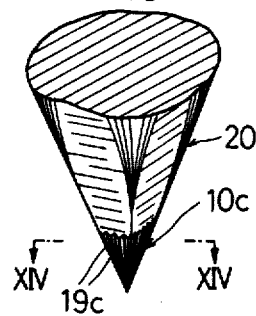
FIG. 13 is likewise a similar view to FIG. 9, showing the fourth embodiment of the screw of the present invention.
Figure 14:
FIG. 14 is a cross section on the line XIV—XIV of FIG. 13.

FIGS. 13 and 14 present a further modified screw having one or more straight grooves 19c, preferably V-shape in cross section, formed in at least one of the triangular flat side surfaces 11 of the hole-drilling section 10c so that each of them extends straight toward the point 13. In this connection, it will be obvious that the V-shaped grooves 19c may be replaced with other adequately shaped ones. In operation, the formed chips are easily removed through said grooves 19c. Each of the modified hole-drilling sections 10a, 10b and 10c described above has an additional advantage in that a desired height of the extrusion 43 is easily obtained since the diameter of the initial pilot hole 41 is actually smaller than that seen in relation to the first embodiment shown in FIGS. 1 to 5, because each of the hole-drilling sections 10a, 10b, 10c is cut away in part and because the formed chips can be easily removed. The selection of one of the modified hole-drilling sections 10a, 10b, 10c may be made in accordance with the hardness, thickness, etc. of a workpiece to which the sheet screw is to be applied.

Figure 15:
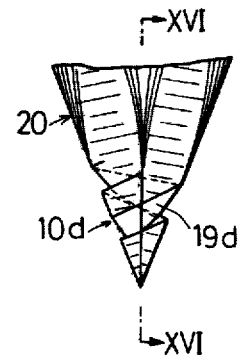
FIG. 15 is a fragmentary elevation showing the fifth embodiment of the screw of the present invention.
Figure 16:
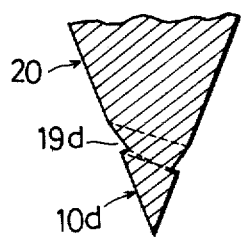
FIG. 16 is a vertical cross section taken along the line XVI—XVI of FIG. 15.

FIGS. 15 and 16 illustrate a further modified screw, in which a substantially spiral groove 19d formed in the triangular flat side surfaces 11 of the hole-drilling section 10d, so that it extends substantially convolutely from a place near the point 13 toward the extruding section 20 in substantially the same direction as the direction of the male threads 31 of the thread-forming section 30. With the groove 19d, not only the chips can be easily removed through said groove 19d but also the initial hole-drilling can be done quite easily since the spiral groove 19d permits the hole-drilling section 10d to start self-advancingly in the formed hole. Consequently, a large driving torque is not required for screwing-in, and therefore, the workpiece 40 is protected from the formation of undesirable depressions. This spiral groove 19d may be formed in combination with any of the aforementioned hole-drilling sections 10a, 10b, 10c, when desired.

Figure 17:
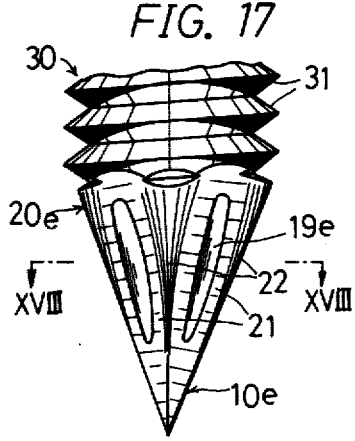
FIG. 17 is a fragmentary elevation of the sixth embodiment of the sheet screw according to the present invention.
Figure 18:
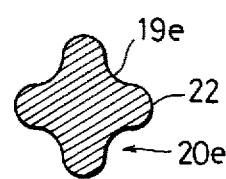
FIG. 18 is a horizontal cross section taken along the line XVIII—XVIII of FIG. 17.

FIGS. 17 and 18 illustrate a still further modified hole-drilling section 10e, wherein at least one substantially vertically extending concavity 19e is formed in each or just some of the side surfaces 21 of the extruding section 20 in position spaced from each of the rounded ridges 22, so that the chips formed by the drilling operation of the section 20e are allowed to escape into the concavity 19e, and thus the inside wall of the formed extrusion 43 is prevented from being damaged. Furthermore, the frictional area of the side surfaces 21 of the extruding section 20 can be reduced and, as a result, a greater driving torque is effectively delivered to the formation of extrusion 43. If desired, said concavity 19e may extend into the triangular side surface 11 of the hole-drilling section 10e. In this case, the extended portion of the concavity 19e may preferably be spaced apart from any of the rectilineal cutting edges 12.

Figure 19:
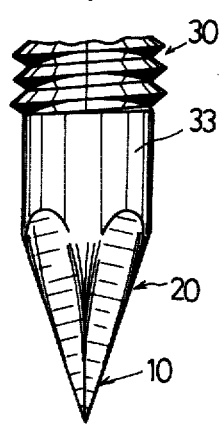
FIG. 19 is a fragmentary elevation of the seventh embodiment of the sheet screw according to the present invention.

FIG. 19 illustrates another modification of the sheet screw according to the present invention, in which a non-threaded cylindrical section 33 is disposed between the thread-forming section 30 and the extruding section 20, the diameter of said cylindrical section 33 being equal to or less than the pitch diameter of the male threads 31. In operation, when said cylindrical section 33 passes through the formed extrusion 43, the latter is corrected in shape to meet the cylindrical surface of the section 33, so that it is almost accurately circular in cross section as well as being perpendicular to the workpiece. Thus, the thread-forming section 30 is then guided to advance into the workpiece correctly without inclination.

The invention being thus described, it will be obvious that the same may be varied in many ways. Such variations are not to be regarded as a departure from the spirit and scope of the invention, and all such modifications are intended to be included within the scope of the present invention.

I claim:
1. A hole-drilling, extruding and thread-forming sheet screw comprising:
(a) a hole-drilling section which is of an inverted regular pyramid in shape and square in cross section with four sharp corners, and has a piercing point at a bottom end, four substantially vertically extending triangular flat side surfaces and four substantially vertically extending rectilineal cutting edges defined by said four sharp corners, each of said cutting edges serving as a drilling edge for drilling a hole in a workpiece and being spaced apart from each other at an equal angular interval and extending divergently from said piercing point at an equal divergent angle with respect to a central vertical axis of said sheet screw passing said piercing point,
(b) an extruding section which is connected at its lower end to and integral with said hole-drilling section, being of an inverted, truncated regular pyramid in shape and square in cross section with four sides and four round corners which are smoothly continuous to one another, said extruding section having four substantially vertically extending rounded ridges defined by said four round corners and four substantially vertically extending flat side surfaces defined by said four sides, each of said four rounded ridges providing a substantially vertically extending smooth, curved surface gradually and progressively increasing in its radius and arcuate length as said rounded ridges extend upwardly, so that the curved surface can serve as an active surface for smoothly enlarging said hole drilled in the workpiece and forcibly deforming metal around said hole to form a desired tubular extrusion with said workpiece initially with an active force concentrated at a lower end of each rounded ridge with a minimum radius and then with said active force gradually dispersed, (c) said radius of each rounded ridge being minimized substantially to zero at a bottom end of said extruding section where each rounded ridge is smoothly continuous with each rectilineal cutting edge of said drilling section in such a manner that a central ridge line of each rounded ridge and an edge line of each cutting edge are disposed on a common rectilineal line, (d) each of said four substantially vertically extending flat side surfaces of said extruding section being smoothly continuous with each of said four substantially vertically extending triangular flat side surfaces of said drilling section in such a manner that both of said side surfaces are disposed in the same vertical plane so that chips produced by said hole-drilling section can be moved into and received within four spaces or gaps defined by said four substantially vertically extending flat side surfaces of said extruding section and an internal wall of said hole drilled in the workpiece, (e) said four substantially vertically extending flat side surfaces of said extruding section still existing even though said arcuate length of said rounded ridges is maximinized at a top end of said extruding section, so that said four spaces or gaps remain at said top end of said extruding section, (f) said extruding section being formed with neither any drilling or cutting edge nor any thread or other projections, and symmetrical with respect to said central vertical axis, (g) an included angle defined by a pair of said rectilineal cutting edges disposed diagonally oppositely being within the range of from 25° to 45°, (h) a height or length of said hole-drilling section being within the range of from about one-fourth to one half of a total height or distance from said piercing point to said top end of said extruding section, (i) a thread-forming section which is connected at its lower end to and integral with said extruding section and having a cylindrical body and male threads formed therewith, said cylindrical body being equal in external diameter in every point, and said male threads being arranged so as to cut female threads internally with said tubular extrusion, and (j) a screw and head connected to a top end of said thread-forming section.

2. The sheet screw as defined in claim 1, wherein said hole-drilling section is partly cut away to form a recess in at least one of said four substantially vertically extending triangular flat side surfaces, said recess being disposed at a position adjacent to at least one of said four substantially vertically extending rectilineal cutting edges, thereby providing at least one acute-angled cutting edge extending along one of said rectilineal cutting edge and a flat, vertical rake face.

3. The sheet screw as defined in claim 1, wherein said hole-drilling section is cut away in half to give a vertical cutting plane passing diagonally through a pair of said rectilineal cutting edge disposed diagonally oppositely, said cutting plane being a vertical rake face, and a pair of acute-angled cutting edges extending substantially upwardly from said piercing point along each of said pair of oppositely disposed rectilineal cutting edges.

4. The sheet screw as defined in claim 1, wherein at least one substantially straight groove is formed in at least one of said substantially vertically extending triangular flat side surfaces of said hole-drilling section.

5. The sheet screw as defined in claim 1, wherein a substantially spiral groove is formed in said hole-drilling section, said spiral groove extending substantially convolutely from a place near said piercing point toward said extruding section but not extending into said extruding section, said spiral groove being formed to run in the substantially same direction as said male threads of said thread-forming section.

6. The sheet screw as defined in claim 1, wherein at least one substantially vertically extending concavity is formed in at least one of said substantially vertically extending flat side surfaces of said extruding section, said concavity being spaced apart from any of said rounded ridges.

7. The sheet screw as defined in claim 6, wherein said concavity extends into said substantially vertically extending triangular flat side surface of said hole-drilling section, said concavity being spaced apart from any of said rectilineal cutting edges.

8. The sheet screw as defined in claim 1, wherein a non-threaded cylindrical section is disposed between said thread-forming section and said extruding section, a diameter of said non-threaded cylindrical section being equal to or less than a pitch diameter of said male threads of said thread-forming section.

* * * * *